(12) United States Patent
Masukawa et al.

(10) Patent No.: US 7,739,616 B2
(45) Date of Patent: Jun. 15, 2010

(54) FILE CONTENT DISPLAY DEVICE, FILE CONTENT DISPLAY METHOD, AND COMPUTER PROGRAM THEREFORE

(75) Inventors: Akihiro Masukawa, Yokohama (JP); Eiji Kato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 336 days.

(21) Appl. No.: 11/457,214

(22) Filed: Jul. 13, 2006

(65) Prior Publication Data

US 2007/0016855 A1 Jan. 18, 2007

(30) Foreign Application Priority Data

Jul. 14, 2005 (JP) .............................. 2005-205611

(51) Int. Cl.
G06F 3/00 (2006.01)
G06F 0/048 (2006.01)
G09G 5/00 (2006.01)

(52) U.S. Cl. ...................... 715/788; 715/716; 715/717; 715/718; 715/719; 715/725; 715/765; 715/744; 715/800; 715/825; 715/826; 345/611; 345/619; 345/629; 345/668

(58) Field of Classification Search ................ 715/710, 715/763, 81, 788, 815, 816, 716–719, 721, 715/725, 765, 747, 744, 745, 800, 825, 826; 345/611, 619, 629, 668
See application file for complete search history.

(56) References Cited

U.S. PATENT DOCUMENTS

| 5,562,353 | A | * | 10/1996 | Handa et al. ............. 400/615.2 |
| 5,721,565 | A | * | 2/1998 | Nguyen ....................... 345/660 |
| 5,729,255 | A | * | 3/1998 | Aoki .......................... 715/723 |
| 5,786,846 | A | * | 7/1998 | Hiroaki ................... 348/14.16 |
| 6,288,702 | B1 | * | 9/2001 | Tachibana et al. ........... 345/671 |
| 6,297,836 | B1 | * | 10/2001 | Kurashina ................... 345/684 |
| 6,400,852 | B1 | * | 6/2002 | Miller et al. ................ 382/298 |
| 6,496,206 | B1 | * | 12/2002 | Mernyk et al. .............. 715/835 |
| 6,567,102 | B2 | * | 5/2003 | Kung ......................... 345/660 |
| 6,587,216 | B1 | * | 7/2003 | Yamada ..................... 358/1.11 |
| 7,315,386 | B1 | * | 1/2008 | Shiimori et al. ............ 358/1.15 |
| 7,334,190 | B2 | * | 2/2008 | Wierowski .................. 715/712 |
| 7,636,097 | B1 | * | 12/2009 | Holloway ................... 345/619 |
| 2001/0022624 | A1 | * | 9/2001 | Tanaka et al. .......... 348/333.02 |
| 2001/0035875 | A1 | * | 11/2001 | Suzuki et al. ............... 345/723 |

(Continued)

OTHER PUBLICATIONS

Screendumps (Microsoft Corporation. Microsoft Professional Edition 2003; 3 pages).*

(Continued)

*Primary Examiner*—Dennis-Doon Chow
*Assistant Examiner*—Linh K Pham
(74) *Attorney, Agent, or Firm*—Canon USA Inc IP Division

(57) ABSTRACT

The present invention relates to a technique for displaying the contents of a file on a display of a computer. Upon receiving an enlargement instruction for performing an enlarged display of a file, a computer detects whether an object included in the file is to be included in an enlarged display range of the file. When it is detected that the object is not to be included in the enlarged display range, the enlarged display range is automatically changed, whereby a user can understand which part of the file the enlarged display range corresponds to without performing a complicated operation.

6 Claims, 12 Drawing Sheets

U.S. PATENT DOCUMENTS

| | | | |
|---|---|---|---|
| 2002/0018136 A1* | 2/2002 | Kaji et al. | 348/333.02 |
| 2002/0032696 A1* | 3/2002 | Takiguchi et al. | 707/500.1 |
| 2002/0140737 A1* | 10/2002 | Sharp | 345/788 |
| 2003/0076363 A1* | 4/2003 | Murphy | 345/800 |
| 2003/0103145 A1* | 6/2003 | Ejima et al. | 348/207.2 |
| 2003/0179915 A1* | 9/2003 | Goto | 382/128 |
| 2003/0193026 A1* | 10/2003 | Takagi | 250/311 |
| 2004/0056883 A1* | 3/2004 | Wierowski | 345/719 |
| 2004/0088656 A1* | 5/2004 | Washio | 715/526 |
| 2004/0186820 A1* | 9/2004 | Izume et al. | 707/1 |
| 2005/0053260 A1* | 3/2005 | Worthington et al. | 382/100 |
| 2005/0071771 A1* | 3/2005 | Nagasawa et al. | 715/765 |
| 2005/0081161 A1* | 4/2005 | MacInnes et al. | 715/765 |
| 2005/0174362 A1* | 8/2005 | Lee et al. | 345/660 |
| 2005/0175362 A1* | 8/2005 | Wilson | 398/212 |
| 2005/0216862 A1* | 9/2005 | Shinohara et al. | 715/825 |
| 2006/0112333 A1* | 5/2006 | Iwanaga | 715/531 |
| 2007/0016855 A1* | 1/2007 | Masukawa et al. | 715/517 |
| 2007/0030293 A1* | 2/2007 | Shimizu | 345/668 |
| 2008/0115089 A1* | 5/2008 | Lee et al. | 715/838 |
| 2009/0066730 A1* | 3/2009 | Mikawa | 345/661 |
| 2010/0020225 A1* | 1/2010 | Hosoi et al. | 348/333.12 |

OTHER PUBLICATIONS

DocumentManagement.com, "WideCapture for PhotoShop." 2004 Edition, 21 pp., http://www.docmanage.com/products/downloads/WIDEcapture.pdf.* bgsu.edu, "Adobe Photoshop CS3 Tutorial", 2007, http://www.bgsu.edu/downloads/cio/file17749.pdf, 37 pages.*

"Adobe Photoshop 6.0"; 2000, http://ftp.lipi.go.id/pub/aplikasi/reader/Adobe_Reader_Manual.pdf; 148 pages.*

* cited by examiner

FIG. 4
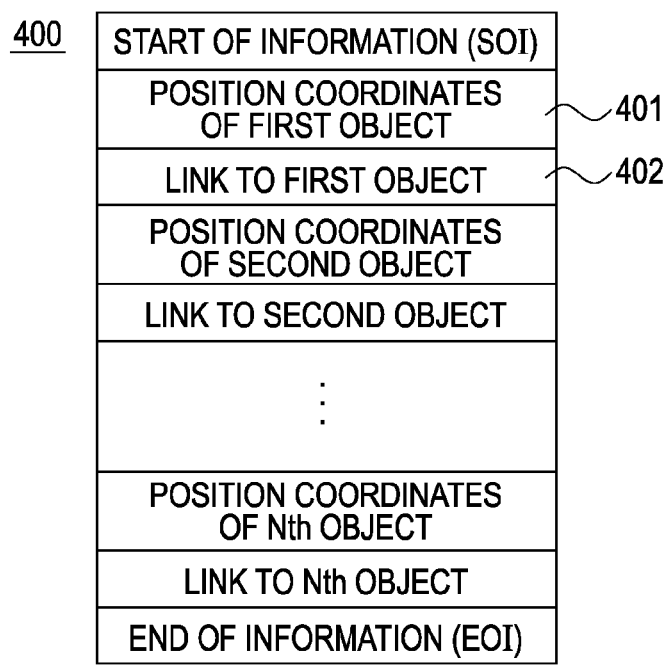
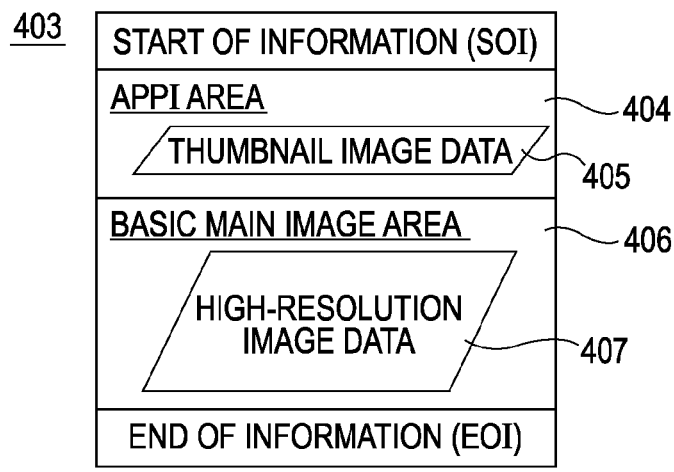
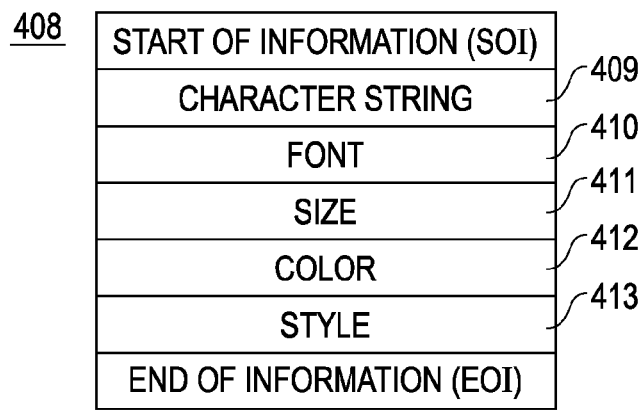

FILE CONTENT DISPLAY DEVICE, FILE CONTENT DISPLAY METHOD, AND COMPUTER PROGRAM THEREFORE

BACKGROUND OF THE INVENTION

1. Field of the Invention

The present invention relates to a technique for displaying an object included in a file, for example, image data, text data, or graphic data, on a display.

2. Description of the Related Art

Personal computers can typically display an object included in a file, for example, image data, text data, or graphic data, on their displays in accordance with a file browser installed therein in advance. When a user inputs an enlargement instruction using a pointing device or a keyboard of a personal computer, the enlarged display of a file is performed on a display.

At that time, when there is space between objects included in a file, only the blank part is sometimes displayed as shown in FIG. 12. Therefore, a user cannot understand which part of the entire file the enlarged and displayed blank part that the user is browsing corresponds to. For the user's understanding, the user is required to input an enlargement reinstruction by performing a complicated operation, for example, moving an enlarged display range by scrolling a screen vertically or horizontally, or reducing a scaling factor, so that any one object of the entire file can be shown in the enlarged display range.

SUMMARY OF THE INVENTION

The present invention provides a file content display device, a file content display method, and a computer program and storage medium therefore that enable a user to understand which part of an entire file a display range corresponds to, without performing a complicated operation, when an enlarged display of the file is provided on the display of a computer.

According to an exemplary embodiment of the present invention, there is provided a file content display device that includes a displaying unit configured to display in a display area the contents of a file that includes an object, an accepting unit configured to accept an enlargement instruction for performing an enlarged display of the file, a deciding unit configured to decide a display range of the file to be displayed in the display area in accordance with the accepted enlargement instruction, a detecting unit configured to detect whether the object is to be at least partially included in the display range of the file, and a changing unit configured to change the decided display range when the detecting unit detects that the object is not to be at least partially included in the display range of the file.

According to another exemplary embodiment of the present invention, there is provided a file content display method that includes displaying in a display area the contents of a file that includes an object, accepting an enlargement instruction for performing an enlarged display of the file, deciding a display range of the file to be displayed in the display area in accordance with the accepted enlargement instruction, detecting whether the object is to be at least partially included in the display range of the file, and changing the decided display range when it is detected that the object is not to be at least partially included in the display range of the file.

According to another exemplary embodiment of the present invention, there is provided a computer program for causing a computer to perform the file content display method and a storage medium storing the computer-executable process steps.

Other features of the present invention will be apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

FIG. 4 is a diagram showing a schematic configuration of an object layout file in an embodiment of the present invention.

DESCRIPTION OF THE EMBODIMENTS

Exemplary embodiments of the present invention will be described in detail by way of example with reference to the accompanying drawings. However, constituent elements described in the embodiments are merely illustrative, and the scope of the present invention is not limited thereto.

First Embodiment

Figure 1:
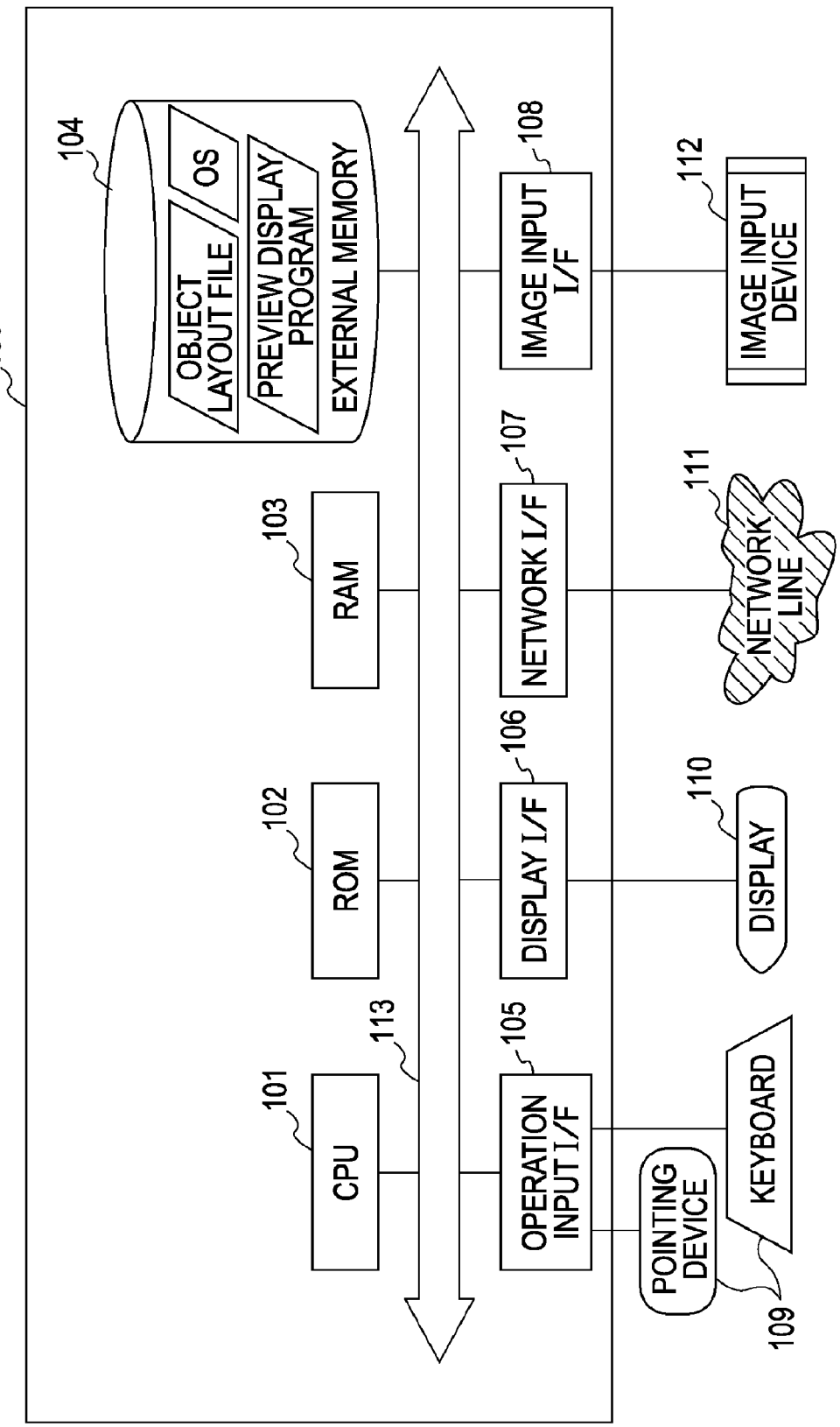
FIG. 1 is a block diagram showing a configuration of a computer device in an embodiment of the present invention.

The configuration of a computer device in this embodiment will be described with reference to the block diagram shown in FIG. 1. The computer device may be a single computer device, or each function thereof may be performed by a plurality of computer devices in a distributed manner as appropriate.

A central processing unit (CPU) 101 controls an entire computer device 100. A read only memory (ROM) 102 stores information that is not required to be rewritten and must not be rewritten. A random access memory (RAM) 103 temporarily stores a program and data, both of which are supplied from an external memory 104. The external memory 104 serves as, for example, a hard disk fixed to the computer device 100, a floppy disk (FD), a compact disc (CD), or a digital versatile disc (DVD) that is removably attached to the computer device 100, or a card-type medium such as an IC card or a memory card. The external memory 104 stores an operating system (OS), a preview display program, and an object layout file configured with image data, text data, and graphic data. An operation input interface 105 serves as an interface for an operation input devices 109 such as a pointing device and a keyboard, both of which are operated by a user. A display interface 106 serves as an interface for a display 110 on which data retained by the computer device 100 or data having been provided is displayed. A network interface 107 serves as an interface for connecting to a network line 111 such as the Internet. An image input interface 108 serves as an interface for an image input device 112 such as a digital still camera, a digital video, or a scanner. A system bus 113 connects units 101 through 108 so that they can communicate with each other.

In this embodiment, the preview display program is stored in the external memory 104. When a user operates the operation input device 109 and provides an instruction for starting the preview display program, the CPU 101 receives the instruction via the operation input interface 105. The CPU 101 reads out the preview display program from the external memory 104 and extracts it on the RAM 103, whereby various screens are displayed on the display 110 in accordance with output data generated from the preview display program. In addition, various processing operations are performed by executing the preview display program in accordance with the command that the CPU 101 has received from one of the operation input devices 109 via the operation input interface 105.

Next, a processing procedure for displaying a preview based on an object layout file on the display 110 by starting and executing the preview display program in the computer device 100 will be described with reference to the flowchart shown in FIG. 2. The CPU 101 executes the following processing by controlling various modules of the computer device 100 in accordance with the preview display program.

In step S200, the preview display program is started.

In step S201, an initial screen is displayed on the display 110.

Figure 3:
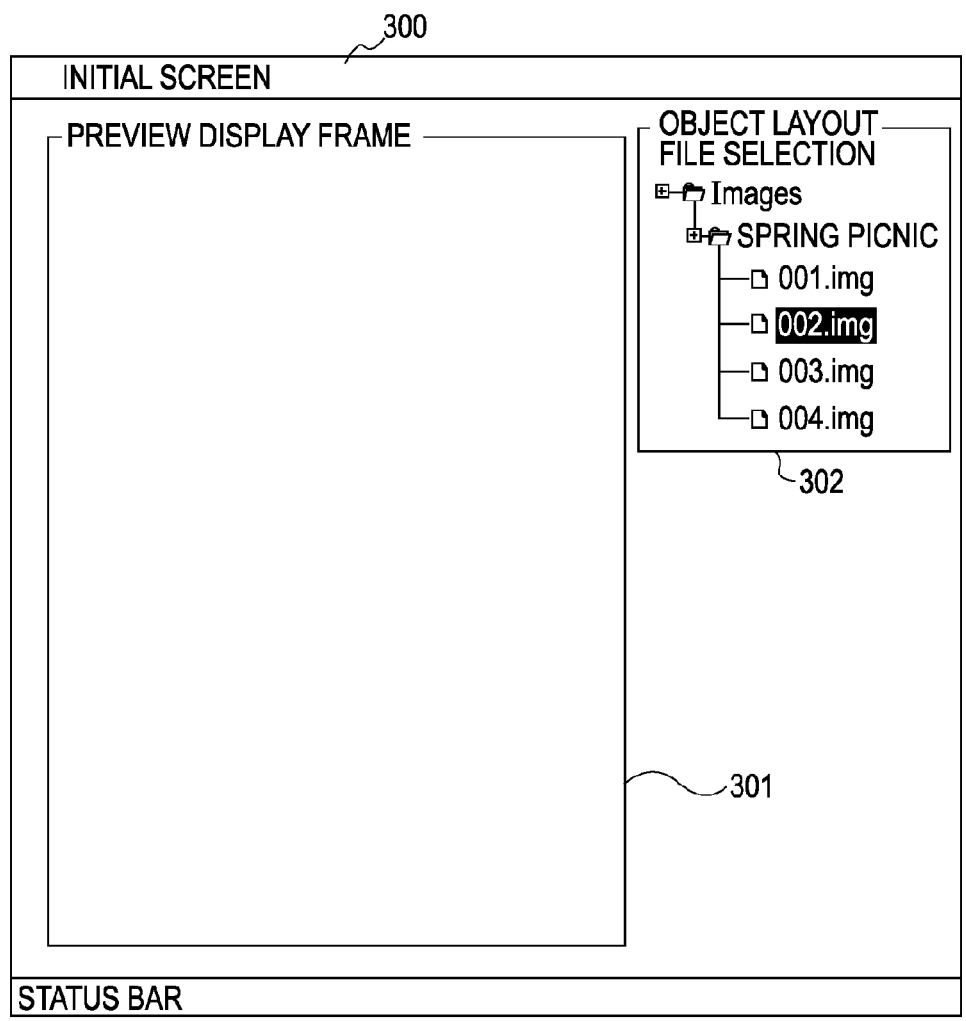
FIG. 3 is a diagram showing an initial screen in an embodiment of the present invention.

An example of the initial screen is shown in FIG. 3. Referring to FIG. 3, a preview display frame 301 in which an image is shown is displayed on an initial screen 300. In an object layout file selection area 302, a list of object layout files stored in the external memory 104 included in the computer device 100 is displayed. A user can select a desired object layout file by operating the operation input device 109. FIG. 3 shows the state in which an object layout file named "002.img" is selected, the object layout file being stored in a folder named "spring picnic" whose hierarchy is lower than that of a folder named "Images". As will be described later, the selected object layout file is displayed in the preview display frame 301.

Returning to FIG. 2, in step S202, the object layout file selected by the user is read out from the external memory 104. Alternatively, the object layout file may be selected from object layout files retained by a web server and then downloaded in a state that the computer device 100 connects to the network line 111 via the network interface 107.

An exemplary schematic configuration of an object layout file is shown in FIG. 4. An object layout file 400 stores a path to text data, graphic data, or image data that configures an object in a path area 402 of each object. In addition, the object layout file 400 stores coordinates representing the position of each object in the object layout file 400 in a position coordinates area 401 of each object. An object is read out from the external memory 104 in accordance with the path stored in the path area 402 and is then previewed on the basis of the position designated by coordinates stored in the position coordinates area 401. In this embodiment, the upper left coordinates and lower right coordinates of a bounding rectangle of each object are stored as coordinates that represent the position of each object.

In this embodiment, image data configuring an object has a configuration compliant with the DCF standard. Image data 403 stores thumbnail image data 405 in an APP1 area 404 and high-resolution image data 407 in a DCF basic main image area 406. In the APP1 area 404, "Exif" information may be also stored. When an object is previewed, a low-resolution image based on the thumbnail image data 405 may be displayed, or a high-resolution image based on the high-resolution image data 407 may be displayed.

In this embodiment, text data 408 configuring an object stores a character string to be previewed in a character string area 409, the type of font in a font area 410, the font size of the character string to be previewed in a size area 411, the font color of the character string to be previewed in a color area 412, and the font style of the character string to be previewed in a style area 413. When an object is previewed, a character string is displayed in accordance with the above-described information.

Returning to FIG. 2, in step S203, coordinates for representing the display position of the preview display frame 301 are obtained. In this embodiment, the upper left coordinates (0, 0) and the lower right coordinates (210, 297) are obtained assuming that the size of the preview display frame 301 is A4, and millimeter is used as a linear measure. The coordinates of the preview display frame 301 are not limited to the above-described coordinates. Another size such as B5 or L size may be used, or other coordinates may be set in accordance with a portrait or landscape orientation.

In step S204, the object layout file 400 is extracted and is then drawn on the basis of the coordinates of the preview display frame 301 acquired in step S203. Consequently, the entire preview of the object layout file 400 is displayed in the preview display frame 301. In this embodiment, a scaling factor is set to Z=1 when the entire preview is displayed in the preview display frame 301. Furthermore, in this embodiment, since the case in which a preview is enlarged will be described, a scaling factor can be presumed to be Z≧1.

Figure 5:
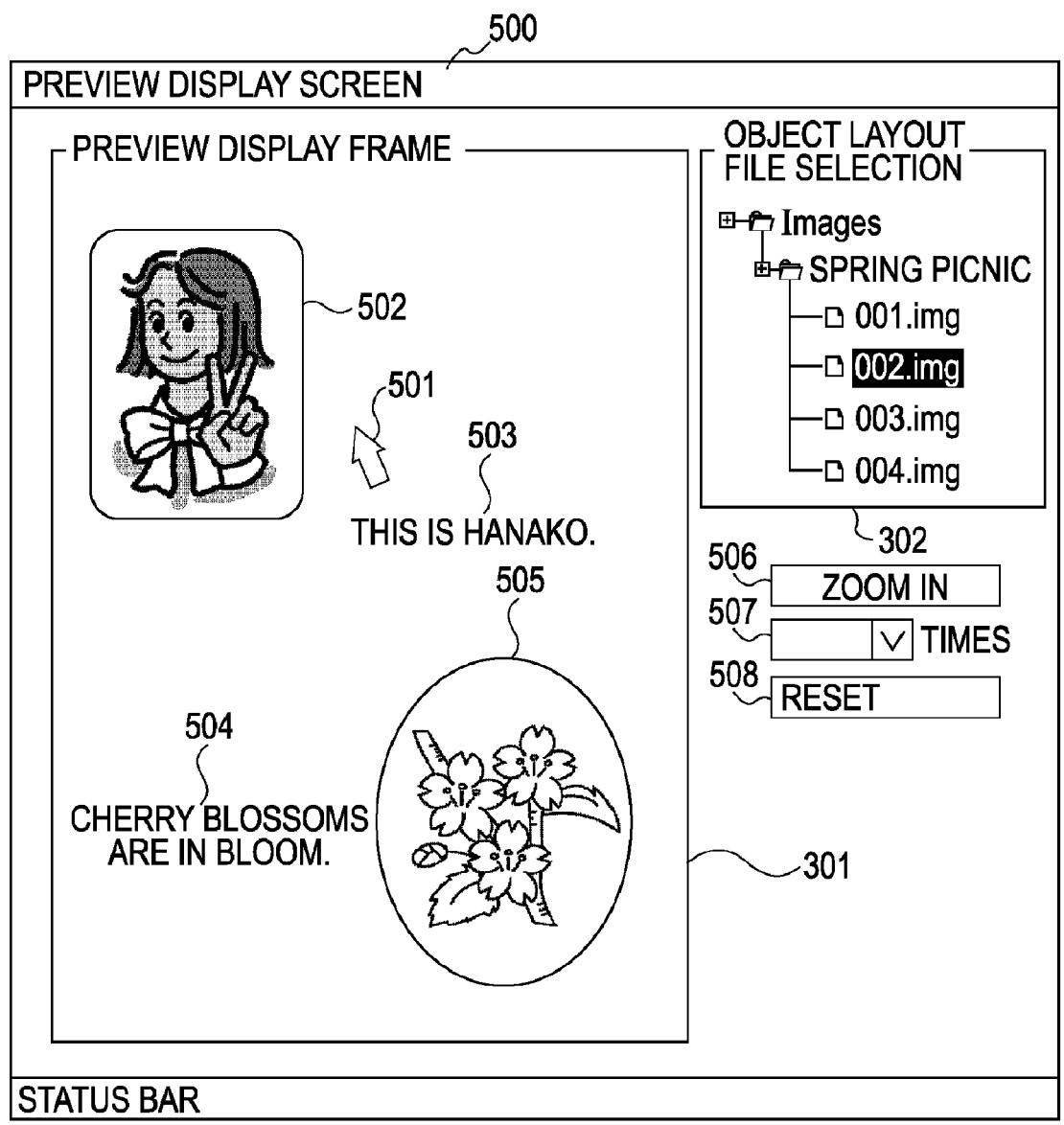
FIG. 5 is a diagram showing a screen on which an entire preview is displayed in an embodiment of the present invention.

An exemplary screen on which the entire preview of the object layout file 400 is displayed in the preview display frame 301 is shown in FIG. 5. A user can move a pointer 501 on the screen by operating the operation input device 109. Objects 502 through 505 are included in the object layout file 400. A zoom button 506 is used for instructing the scaling of a preview. When a user presses the operation input device 109, it is determined that the scaling of a preview has been instructed. A scaling factor input field 507 is used for inputting a scaling factor when a preview is enlarged or reduced. A reset button 508 is used for instructing that an enlarged or reduced preview is displayed at the original scaling factor.

Returning to FIG. 2, in step S205, it is determined whether the enlargement of a preview has been instructed. More specifically, a user enters a number in the scaling factor input field 507 on a preview display screen 500 by operating the operation input device 109, and designates a datum position by moving the pointer 501, and presses the zoom button 506, whereby it is determined that the enlargement of a preview has been instructed.

Next, in step S206, after a scaling factor and coordinates indicating a datum position are acquired, an enlarged display range in the object layout file 400 is calculated. Here, when it is presumed that the scaling factor is represented as z, and that the coordinates indicating a datum position are represented as ($p_x$, $p_y$), the upper left coordinates ($ex_1$, $ey_1$) of the enlarged display range are calculated as follows.

$$(e_{x1}, e_{y1}) = \left(p_x - \frac{210}{2Z}, p_y - \frac{297}{2Z}\right) \quad \text{[Equation 1]}$$

The lower right coordinates ($e_{x2}$, $e_{y2}$) are calculated as follows.

$$(e_{x2}, e_{y2}) = \left(p_x + \frac{210}{2Z}, p_y + \frac{297}{2Z}\right) \quad \text{[Equation 2]}$$

When the enlarged display range having been calculated as described above becomes larger than the range of the preview display frame 301, namely, the range between (0, 0) and (210, 297), the enlarged display range is recalculated as follows.

For example, when the X coordinate of the upper left coordinates is $e_{x1}$<0, the X coordinate of the lower right coordinates, $e_{x2}$, is calculated as follows.

$$e_{x2} = \left(p_x + \frac{210}{2Z}\right) - \left(p_x - \frac{210}{2Z}\right) \quad \text{[Equation 3]}$$

The X coordinate of the upper left coordinates is set to $e_{x1}$=0.

When the X coordinate of the lower right coordinates is $e_{x2}$>210, the X coordinate of the upper left coordinates, $e_{x1}$, is calculated as follows.

$$e_{x1} = 210 - \left\{\left(p_x + \frac{210}{2Z}\right) - \left(p_x - \frac{210}{2Z}\right)\right\} \quad \text{[Equation 4]}$$

The X coordinate of the lower right coordinates is set to $e_{x2}$=210.

The Y coordinates of the upper left and lower right coordinates are also individually recalculated by the same method used for calculating the X coordinates.

In this embodiment, the case in which the datum position corresponds to the center position of the enlarged display range has been described. However, the datum position may not be limited to the above-described case, and may correspond to another position, for example, one of the corners of the enlarged display range.

Figure 6:
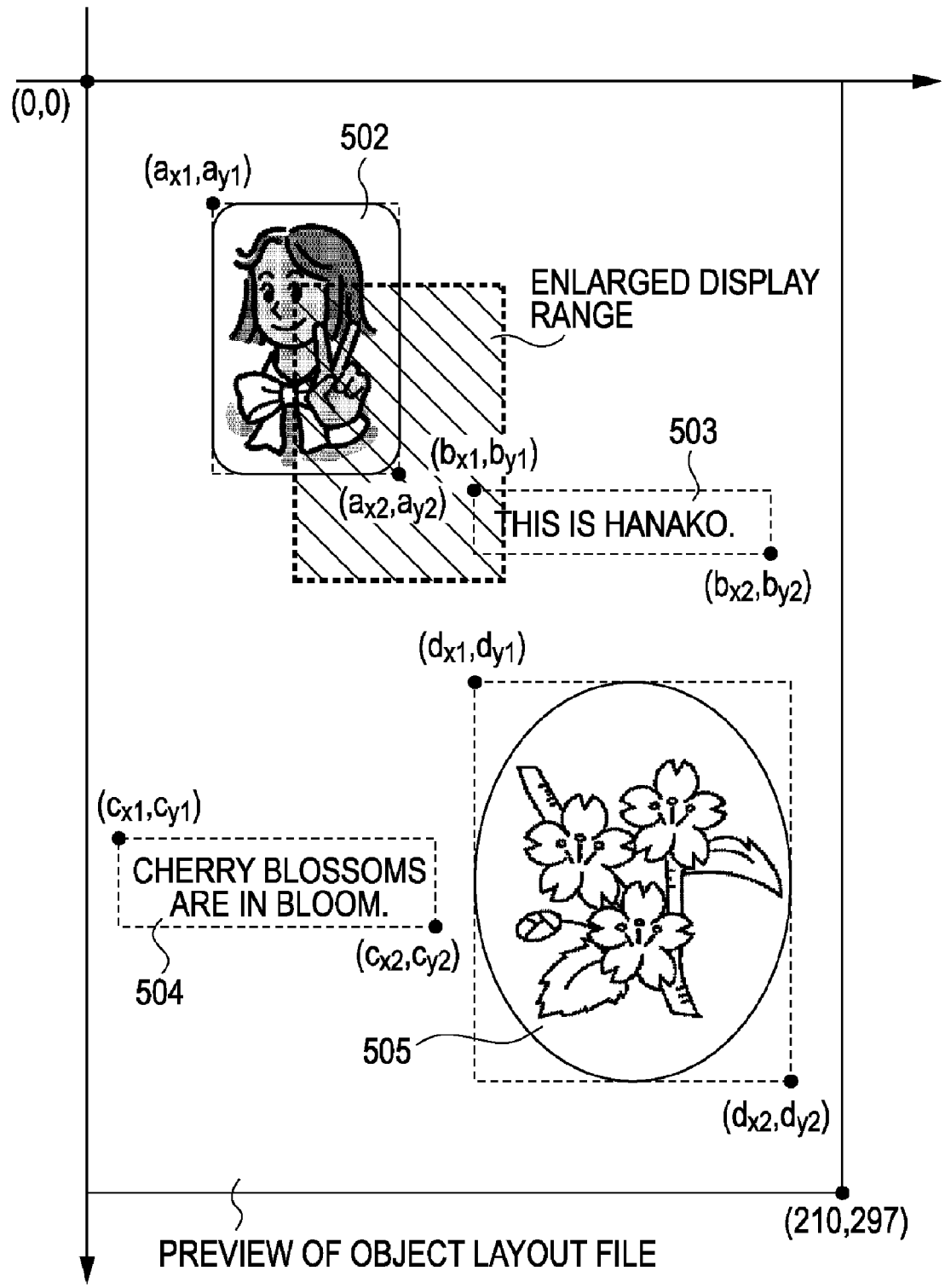
FIG. 6 is a diagram showing coordinates of a bounding rectangle of each object and coordinates of an enlarged display range in an embodiment of the present invention.

In step S207, it is determined whether any one object is to be at least partially included in the enlarged display range having been calculated in step S206. The position of an object 502 included in the object layout file 400 is managed using the upper left coordinates ($a_{X1}$, $a_{Y1}$) and the lower right coordinates ($a_{X2}$, $a_{Y2}$) of the bounding rectangle thereof. Similarly, the positions of objects 503, 504, and 505 are respectively managed using the upper left coordinates ($b_{X1}$, $b_{Y1}$), ($c_{X1}$, $c_{Y1}$), and ($d_{X1}$, $d_{Y1}$) and the lower right coordinates ($b_{X2}$, $b_{Y2}$), ($c_{X2}$, $C_{Y2}$), and ($d_{X2}$, $d_{Y2}$) of the bounding rectangles thereof. Each coordinate is shown in FIG. 6. In FIG. 6, positive X coordinates go to the right of the origin in the direction of the X-axis, and positive Y coordinates go down from the origin in the direction of the Y-axis.

By comparing the coordinates of each object with the coordinates of the enlarged display range having been calculated in S206, it is determined whether any one object is to be included in the enlarged display range. That is, for example, when the result of the comparison between the coordinates of the object 502 and the coordinates of the enlarged display range fulfills the condition of $a_{X1}$<$e_{x2}$, $a_{X2}$>$e_{x1}$, $a_{Y1}$<$e_{y2}$, and $a_{Y2}$>$e_{y1}$, it is determined that the object 502 is to be included in the enlarged display range. Other objects undergo the same process as this case.

When any objects are not included in the object layout file, the following processing, which is performed when it is determined that any one object is to be at least partially included in the enlarged display range, is performed.

When it has been determined that any one object is to be at least partially included in the enlarged display range in step S207, in step S208, the object layout file 400 is extracted and is then enlarged at the scaling factor having been specified by a user. Subsequently, the enlarged display range, which has been calculated in step S206, included in the acquired object layout file 400, is drawn on the basis of the coordinates of the preview display frame 301, which has been acquired in step S203. Consequently, the enlarged preview of the object layout file 400 is displayed in the preview display frame 301.

Figure 7:
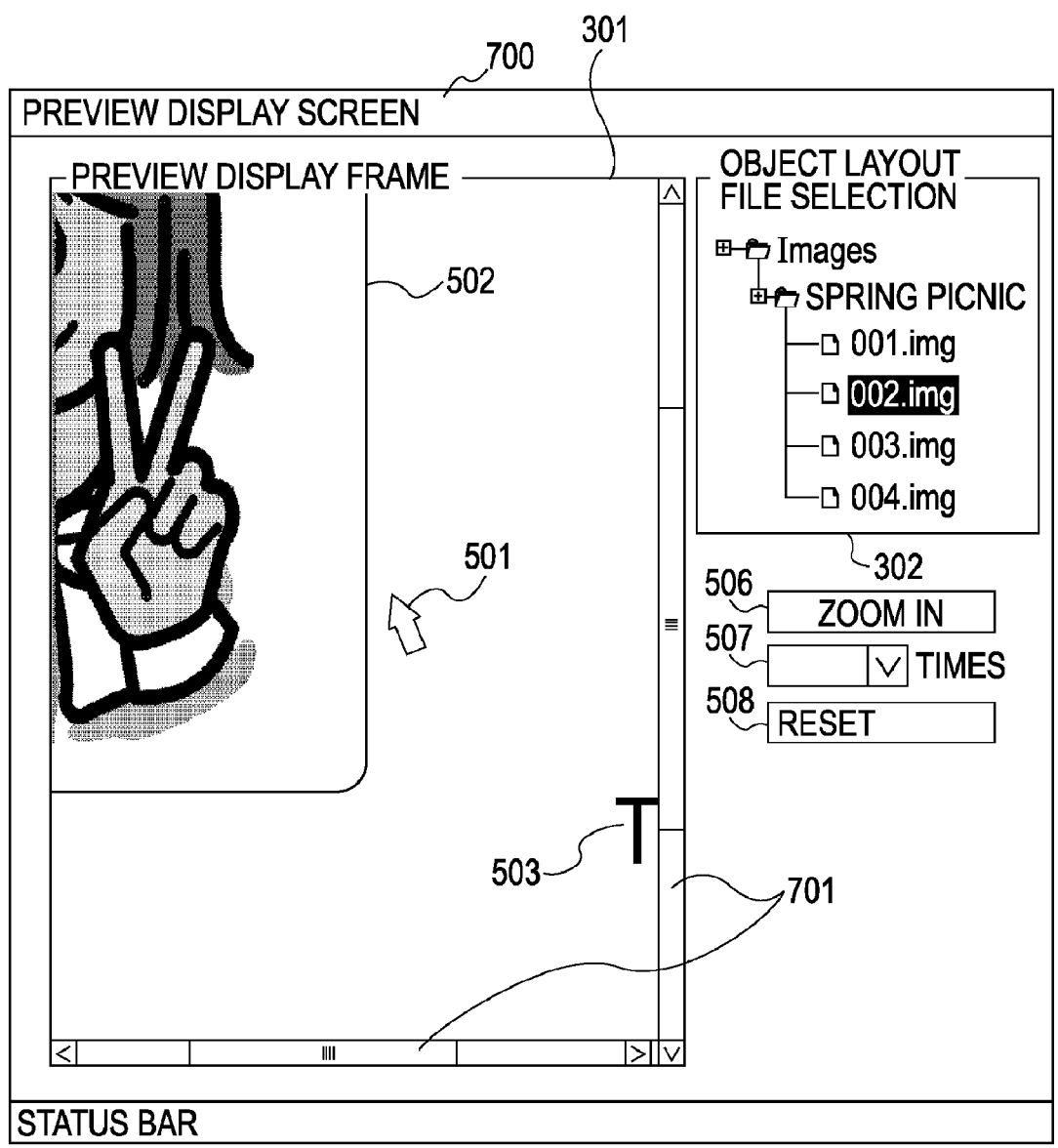
FIG. 7 is a diagram showing a screen on which an enlarged preview is displayed in an embodiment of the present invention.

An exemplary screen on which an enlarged preview is displayed in the preview display frame 301 is shown in FIG. 7. The size of an enlarged preview display screen 700 is the same as that of the preview display screen 500. Accordingly, although the entire object layout file 400 is displayed in the preview display frame 301 in FIG. 5, only a part of the object layout file 400 is displayed in FIG. 7. When a user moves one of scroll bars 701 by operating the operation input device 109, the display range of the object layout file 400, which is surrounded with the preview display frame 301, is moved in response to the movement operation of the scroll bar performed by the user.

Figure 8:
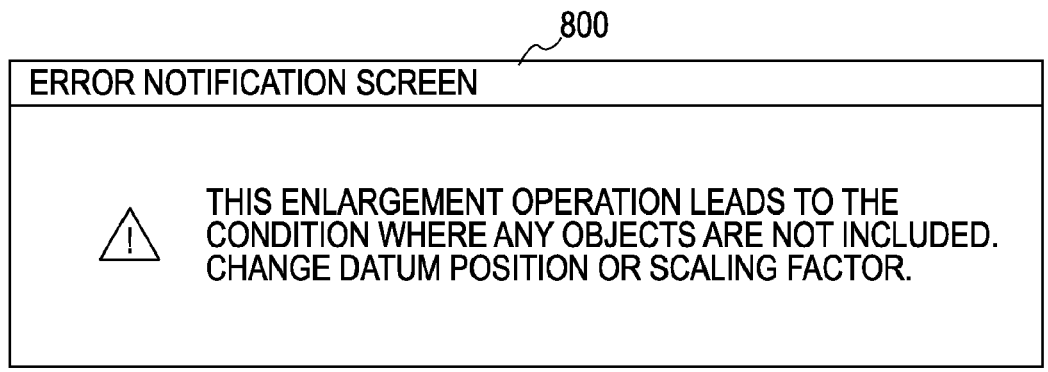
FIG. 8 is a diagram showing an error notification screen in an embodiment of the present invention.

Returning to FIG. 2, when it has been determined that any one object is not to be at least partially included in the enlarged display range in step S207, in order to notify the user that no objects will be included in an enlarged preview, an error notification screen 800 shown in FIG. 8 is displayed in step S209. Thus, a user is prompted to change a datum position or a scaling factor for enlargement processing.

As described previously, according to this embodiment, when a user views an enlarged preview, the case in which no objects are included in the display range of the enlarged preview can be prevented. Accordingly, the user can easily understand which part of the entire preview the display range of the enlarged preview corresponds to by referring to a displayed object.

Moreover, according to this embodiment, before an enlarged preview not including any objects is displayed, a user can change the instruction of enlargement so that any one object can be included in the display range of an enlarged preview, thereby saving time and trouble.

Second Embodiment

Next, the case in which a scaling factor is automatically set in accordance with a preview display program so that any one object can be included in an enlarged preview will be described. Only those portions of the present embodiment different from the above described embodiment will be described in detail below.

Figure 9:
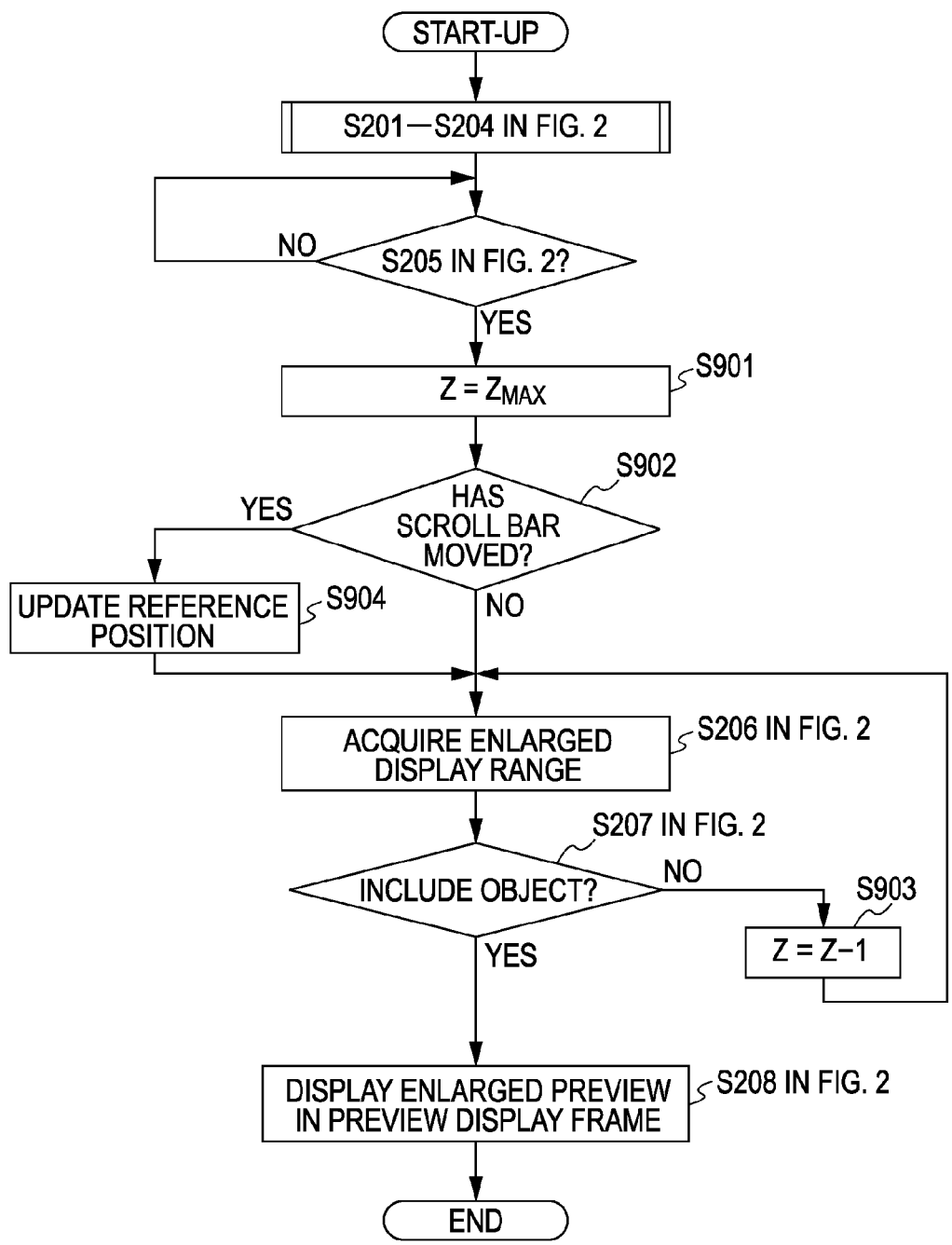
FIG. 9 is a flowchart showing a processing procedure for displaying a preview in an embodiment of the present invention.

First, a processing procedure for displaying a preview based on an object layout file on the display 110 by starting and executing a preview display program will be described with reference to the flowchart shown in FIG. 9. The CPU 101 performs the following processing by controlling various modules of the computer device 100 in accordance with the preview display program.

Figure 2:
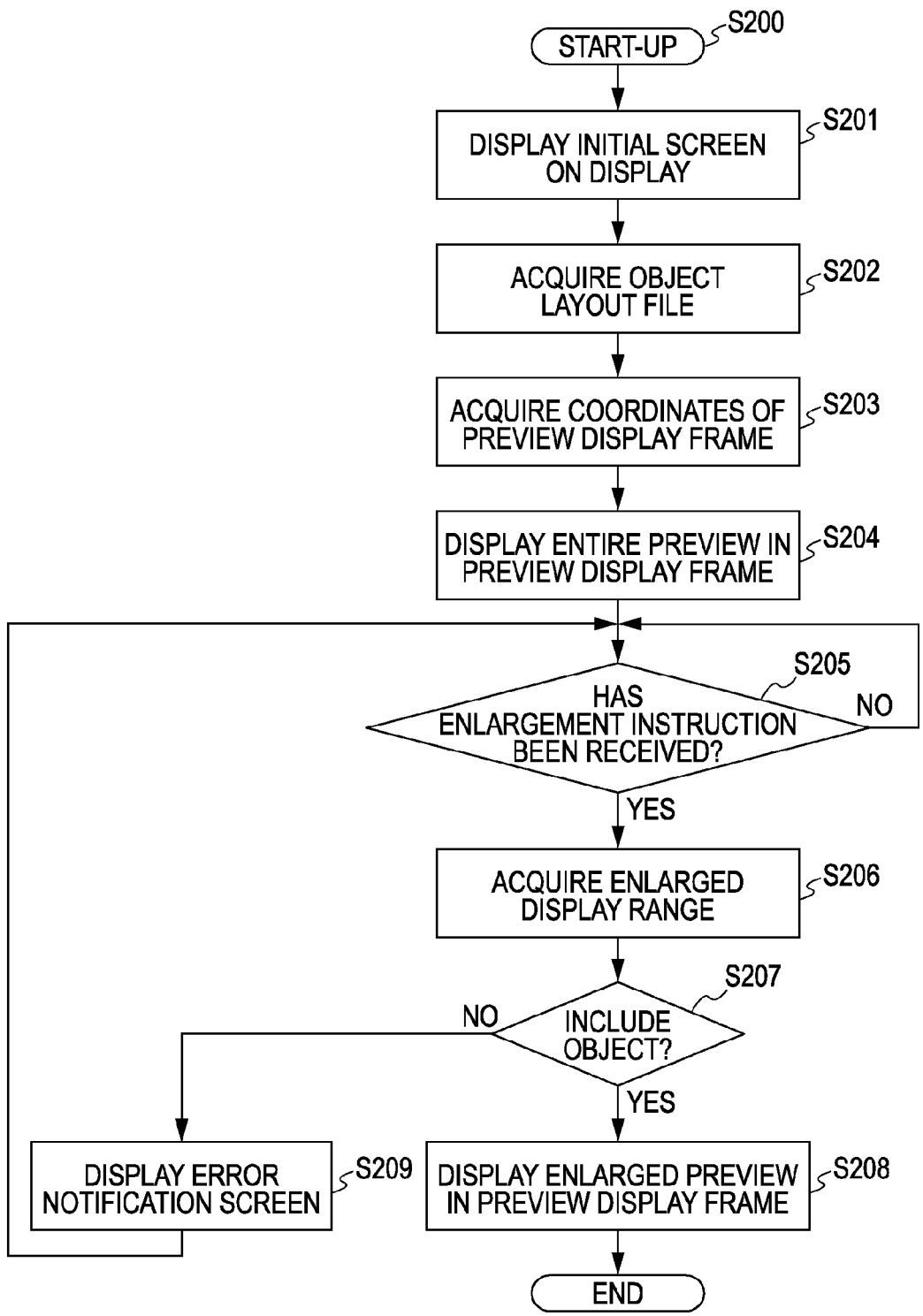
FIG. 2 is a flowchart showing a processing procedure for displaying a preview in an embodiment of the present invention.

Like the first embodiment, processing of steps S201 through S205 in FIG. 2 is performed. However, in step S205, a scaling factor is not required to have been input in advance. When a scaling factor has not been input by a user, the following steps are performed.

Next, in step S901, the maximum scaling factor having been given in advance is set as a scaling factor. For example, in this embodiment, it is presumed that the maximum scaling factor is set to 10.

In step S902, it is determined whether one of the scroll bars 701 has been moved.

When it has been determined that one of the scroll bars 701 was not moved, the processing of steps S206 and S207 in FIG. 2 is performed.

When it has been detected that any one object is not to be at least partially included in the enlarged display range in step S207, the set value of a scaling factor is decremented by one in step S903. Using the result of the decrement, the value of the scaling factor is updated. Subsequently, the processing of step S206 is performed again.

When it has been detected that any one object is to be at least partially included in the enlarged display range in step S207, the object layout file 400 is extracted and is then enlarged at the scaling factor having been set. Subsequently, the enlarged display range having been acquired in step S206 is drawn on the basis of the coordinates of the preview display frame 301, which have been acquired in step S203. Consequently, an enlarged preview of the object layout file 400 is displayed in the preview display frame 301 in step S208 shown in FIG. 2.

Figure 10:
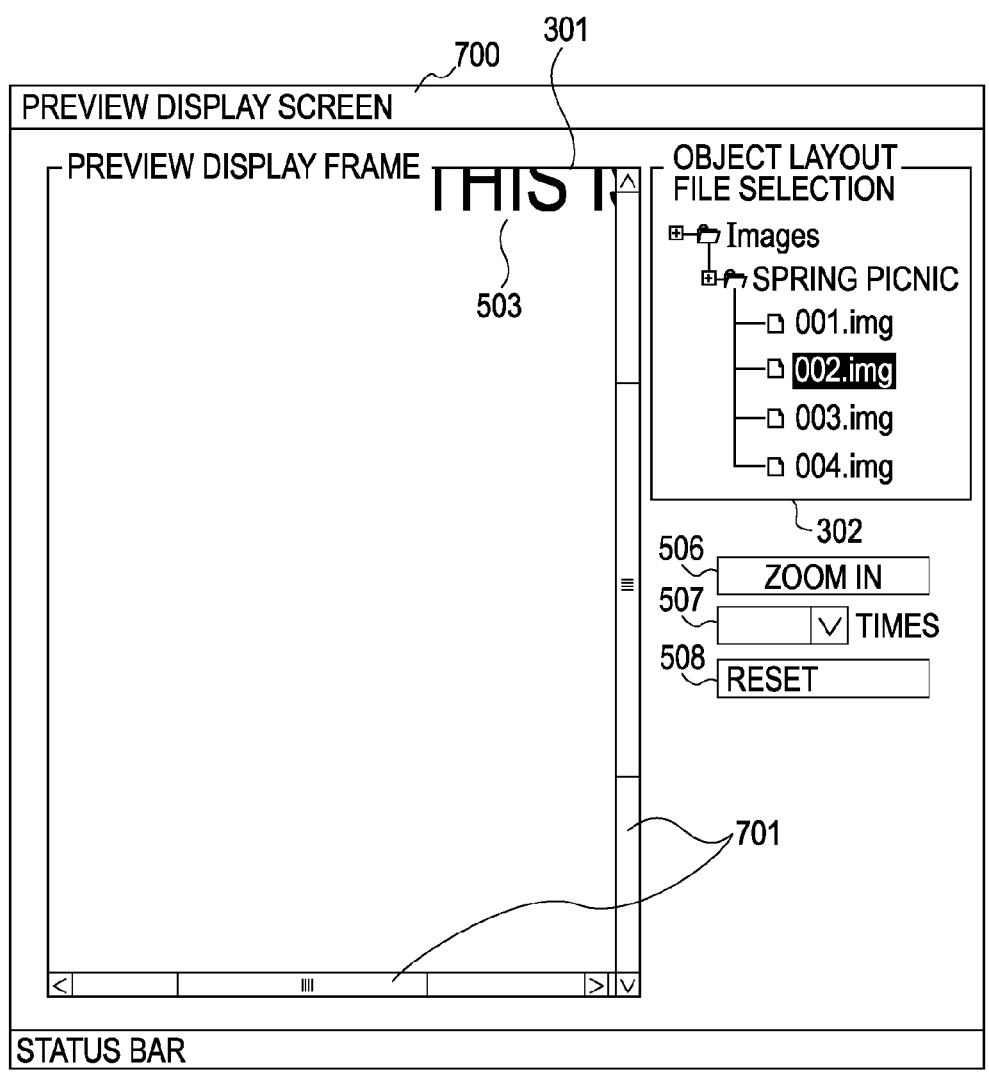
FIG. 10 is a diagram showing a screen on which an enlarged preview is displayed in an embodiment of the present invention.
Figure 11:
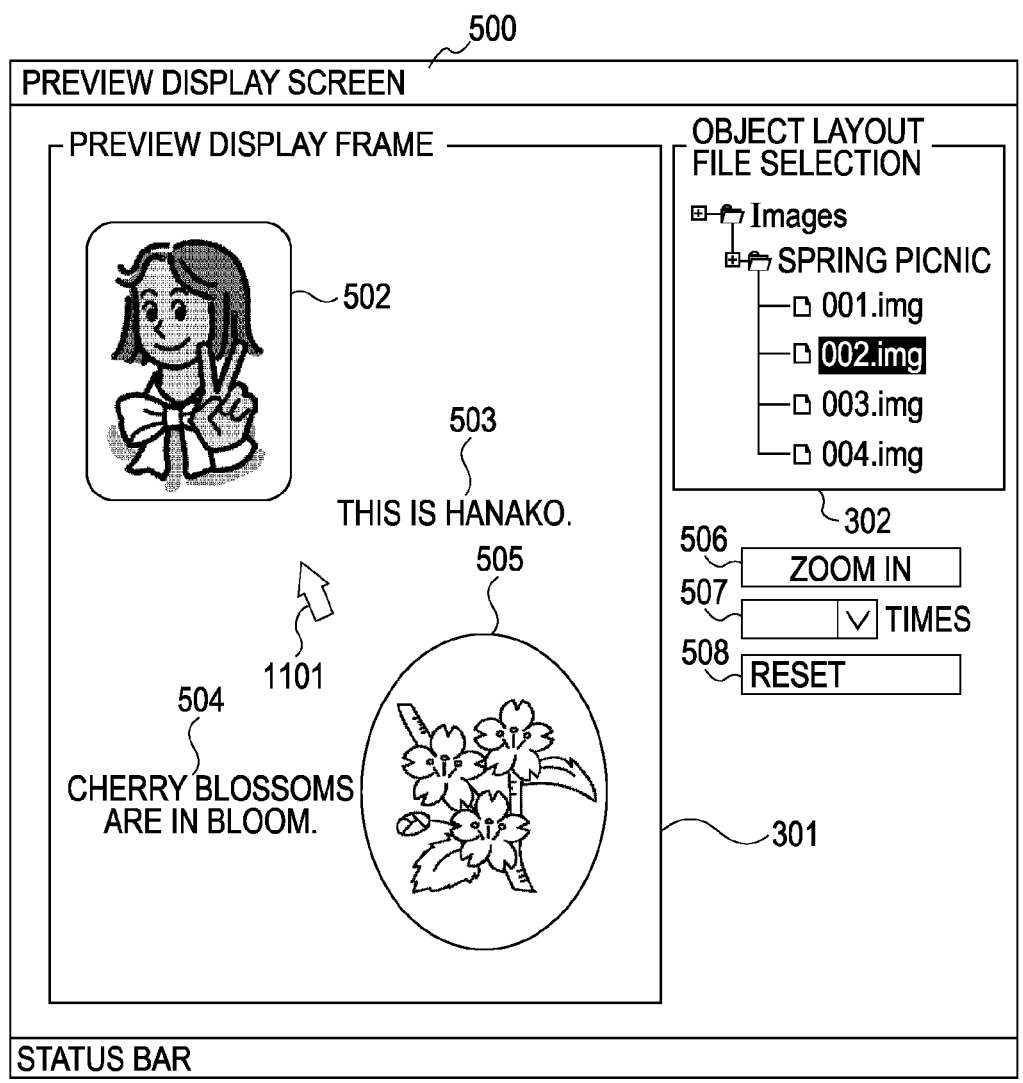
FIG. 11 is a diagram showing a screen on which an entire preview is displayed in an embodiment of the present invention.
Figure 12:
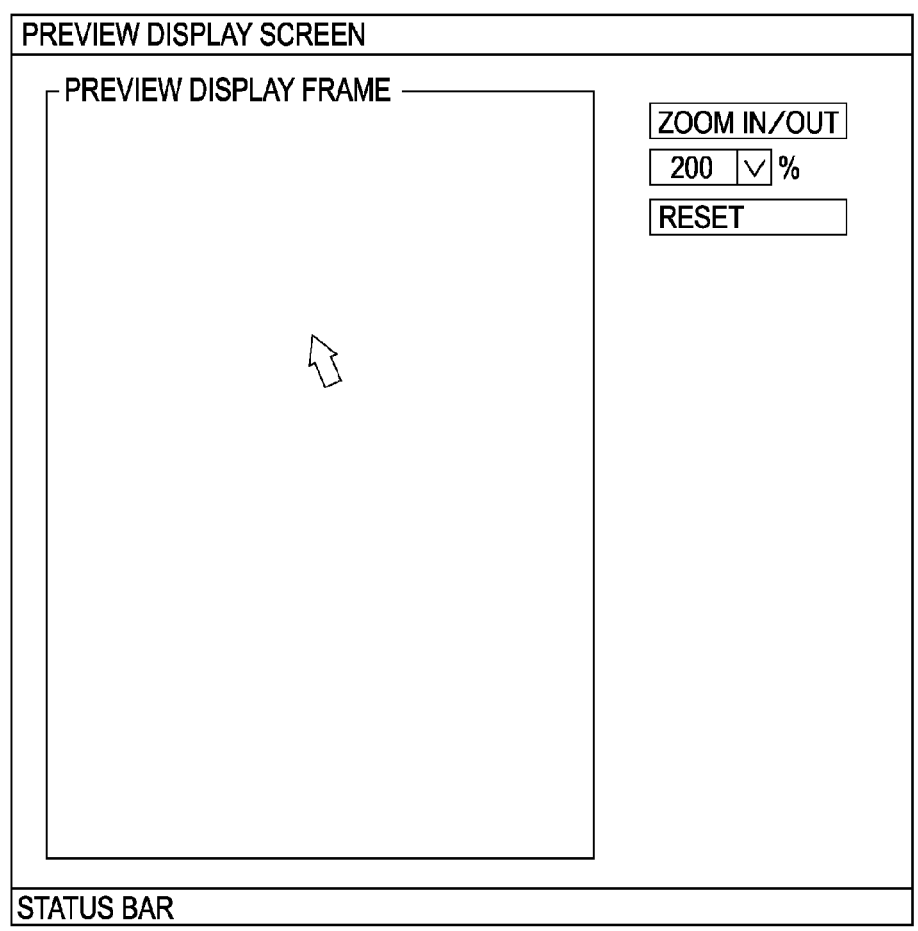
FIG. 12 is a diagram showing a screen on which an enlarged preview is displayed in a known technique.

Here, an exemplary screen on which the enlarged preview is displayed in the preview display frame 301 is shown in FIG. 10. The screen shown in FIG. 10 is acquired when a position indicated by a pointer 1101 is designated as a datum position as shown in FIG. 11.

Returning to FIG. 9, when it has been determined that one of the scroll bars 701 was moved in step S902, in step S904, the datum position is updated using the position of the preview, the position corresponding to the center position of the preview display frame 301. Subsequently, the processing of step S206 in FIG. 2 is performed, and then processing based on a current scaling factor is performed.

A user may set whether the above-described processing in which a scaling factor is automatically changed is performed. In this case, the computer device 100 stores in the external memory 104 a flag indicating whether the automatic change of a scaling factor can be performed which has been set by the user using the preview display program. If the flag indicates that the automatic change of a scaling factor is allowed, the computer device 100 performs the above-described processing procedure shown in FIG. 9.

Thus, according to this embodiment, once a user designates a datum position for enlargement processing of a preview, the user can view a preview having been enlarged at the scaling factor that has been automatically set so that any one object can be included in an enlarged display range.

Furthermore, according to this embodiment, even if a user changes the datum position for enlargement processing of a preview in progress, the user can view a preview having been enlarged at the scaling factor that has been automatically set so that any one object can be included in an enlarged display range.

Still furthermore, according to this embodiment, when a user views an enlarged preview of a file on a display of a personal computer, the case in which any objects are not included in a display range of the enlarged and displayed preview can be prevented. Accordingly, such an effect that the user can easily understand which part of the entire preview the display range of the enlarged and displayed preview corresponds to by referring to a displayed object can be obtained.

Although the previous embodiments relate to an object layout file, for example supplied by a web server or computer, the present invention is also applicable to image files captured for example by a digital camera. Specifically, a digital camera (still or video) can be configured to include a data display device as described above. In other words, the object layout file can comprise, for example, raw data from a CCD imaging device, or a compressed JPEG, GIF, or MPEG file representing a photograph or video.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-205611 filed Jul. 14, 2005, which is hereby incorporated by reference herein in its entirety.

What is claimed is:

1. A file display device comprising:
    an obtaining unit configured to obtain a file in which path information indicating a stored location of image data and text data, and position information indicating a display position where the image data and the text data are positioned in a display frame are included;
    a designating unit configured to designate a display range in accordance with a user's operation;
    a displaying unit configured to display the image data and the text data which exist in the display range by arranging them in a display frame based on the path information and the position information of the file;
    a detecting unit configured to detect whether at least one of the image data or the text data exists in the designated display range based on the position information; and
    an adjusting unit configured to automatically adjust the designated display range so as to exist at least one of the image data or the text data when the detecting unit detects that none of the image data and the text data exists in the display range,
    wherein the displaying unit displays the image data and the text data which exist in the adjusted display range by arranging them in the display frame.

2. The file display device according to claim 1, further comprising an error displaying unit configured to display an error notification screen when the detecting unit detects that none of the image data or the text data exists in the display range.

3. The file display device according to claim 1, further comprising
    a setting unit configured to set whether the change of the display range to be performed by the changing unit is allowed, and
    wherein, when the change of the display range is set to be allowed by the setting unit, the changing unit changes the display range.

4. The file display device according to claim 1, wherein the designating unit designates a scaling factor and a datum position.

5. A file display method comprising:
- obtaining a file in which path information indicating a stored location of image data and text data, and position information indicating a display position where the image data and the text data are positioned in a display frame are included;
- designating a display range in accordance with a user's operation;
- displaying the image data and the text data which exist in the display range by arranging them in a display frame based on the path information and the position information of the file;
- detecting whether at least one of the image map data or text data exists in the designated display range based on the position information; and
- automatically adjusting the designated display range so as to exist at least one of the image data or the text data when it is detected that none of the image data and the text data exists in the display range,
- wherein displaying the image data and the text data which exist in the adjusted display range by arranging them in the display frame.

6. A storage medium on which a program for causing a computer to perform a file display method is stored, the file display method comprising the steps of:
- obtaining a file in which path information indicating a stored location of image data and text data, and position information indicating a display position where the image data and the text data are positioned in a display frame are included;
- designating a display range in accordance with a user's operation;
- displaying the image data and the text data which exist in the display range by arranging them in a display frame based on the path information and the position information of the file;
- detecting whether at least one of the image data or text data exists in the designated display range based on the position information; and
- automatically adjusting the designated display range so as to exist at least one of the image data or the text data when it is detected that none of the image data and the text data exists in the display range,
- wherein displaying the image data and the text data which exist in the adjusted display range by arranging them in the display frame.

* * * * *